(12) United States Patent
Ward

(10) Patent No.: US 6,694,723 B2
(45) Date of Patent: Feb. 24, 2004

(54) VALVE ASSEMBLY FOR GAS TURBINE ENGINE

(75) Inventor: Eric J. Ward, West Palm Beach, FL (US)

(73) Assignee: United Technologies Corporation, Hartford, CT (US)

(*) Notice: Subject to any disclaimer, the term of this patent is extended or adjusted under 35 U.S.C. 154(b) by 88 days.

(21) Appl. No.: 10/109,109

(22) Filed: Mar. 27, 2002

(65) Prior Publication Data

US 2003/0205043 A1 Nov. 6, 2003

(51) Int. Cl.[7] .................................................. F02K 1/00
(52) U.S. Cl. ............................ 60/232; 60/766; 60/770; 239/265.35
(58) Field of Search ................... 60/232, 228, 766, 60/770, 785, 39.85; 239/265.35, 265.39, 265.19

(56) References Cited

U.S. PATENT DOCUMENTS

| | | | |
|---|---|---|---|
| 3,429,509 A | | 2/1969 | Markowski |
| 4,222,233 A | | 9/1980 | Johnson et al. |
| 4,587,804 A | * | 5/1986 | Horinouchi et al. ........... 60/230 |
| 5,348,252 A | | 9/1994 | Balsdon |
| 5,351,888 A | | 10/1994 | Taylor et al. |
| 5,445,392 A | | 8/1995 | Bruckner |
| 5,485,959 A | * | 1/1996 | Wood et al. ............ 239/265.41 |
| 5,799,874 A | | 9/1998 | Eigenbrode et al. |
| 6,199,772 B1 | | 3/2001 | Renggli |

* cited by examiner

*Primary Examiner*—Ehud Gartenberg
(74) *Attorney, Agent, or Firm*—Brian J. Hamilla

(57) ABSTRACT

A valve assembly for supplying cooling air to a nozzle of a gas turbine engine. The nozzle can move between a first configuration and a second configuration. The valve assembly includes a first member having openings that receive cooling air. The valve assembly also includes a second member having openings. The second member resides adjacent the first member to receive the cooling air from the first member. Finally, the valve assembly includes actuator for moving the first member from a first position, which allows a first flow rate of cooling air to pass through the openings, to a second position, which allows a second flow rate of cooling air to pass through the openings. The second flow rate is less than the first flow rate.

17 Claims, 9 Drawing Sheets

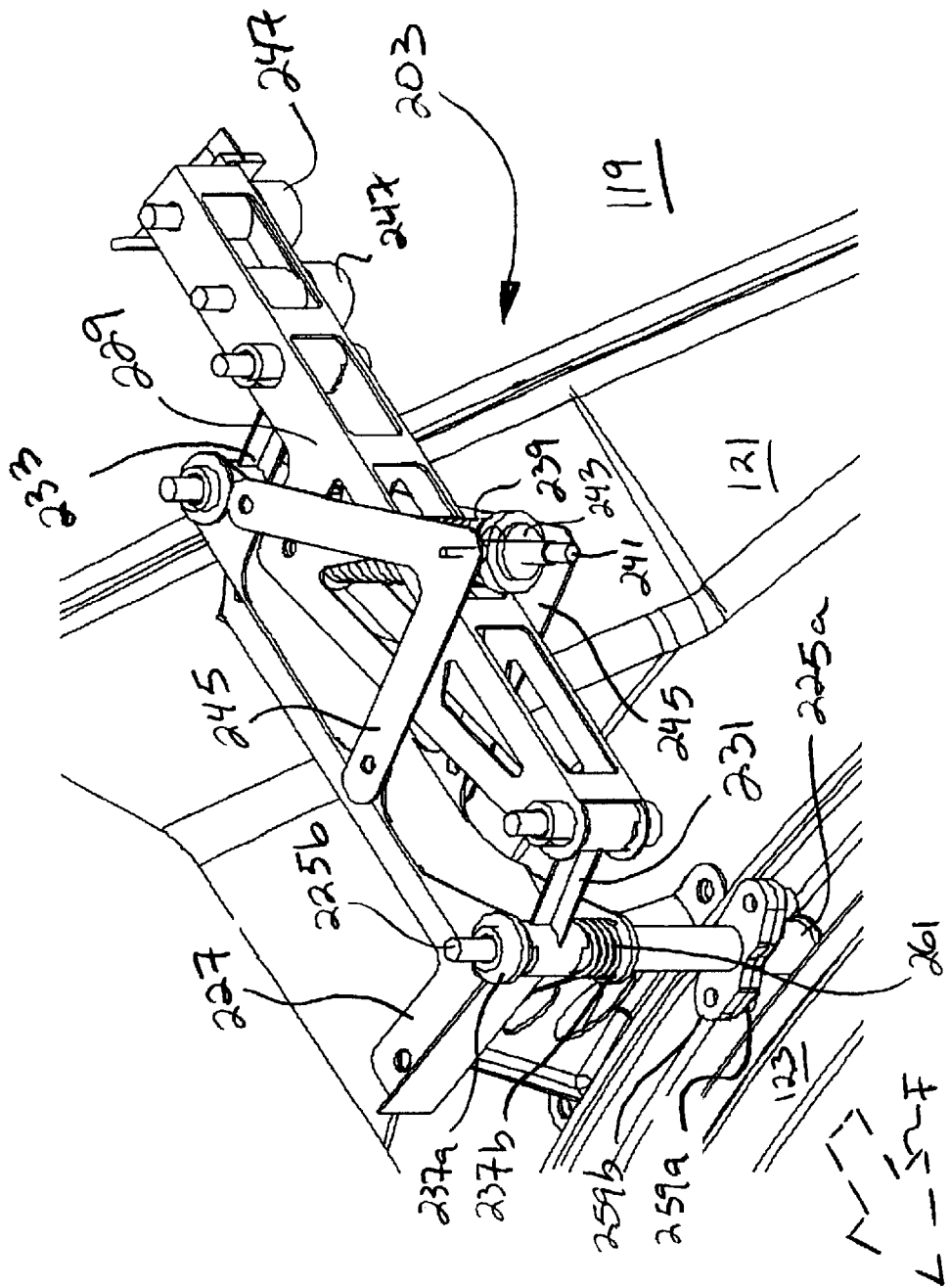

VALVE ASSEMBLY FOR GAS TURBINE ENGINE

GOVERNMENT RIGHTS

The U.S. Government may have rights in this invention pursuant to Contract Number N00019-02-C-3003.

BACKGROUND OF THE INVENTION

This invention relates to a valve assembly for a gas turbine engine. Specifically, this invention relates to a valve assembly that controls the amount of cooling air supplied to a nozzle a of a gas turbine engine.

The major components of a gas turbine engine include (beginning at the upstream end, or inlet) a compressor section, a burner section, a turbine section, and a nozzle section. The engine may have an afterburner section between the turbine section and the nozzle section.

If the engine is a turbofan, then the compressor section includes a fan section at the upstream end. After passing the fan section, the turbofan engine separates the air into two flow paths. A primary flow (also referred to as core engine flow) enters the remainder of the compressor section, mixes with fuel, and combusts in the burner section. The gases exit the burner section to power the turbine section.

A secondary flow (also referred to as bypass flow) avoids the remainder of the compressor section, the burner section and the turbine section. Instead, the secondary flow travels through a duct to a location downstream of the turbine section. The secondary flow mixes with the primary flow downstream of the turbine section.

As necessary, the afterburner section could augment the thrust of the engine by igniting additional fuel downstream of the turbine section. The flow then exits the engine through the nozzle.

The engine must supply cooling air to the nozzle in order to protect the nozzle components from the high temperature exhaust. Typically, the engine diverts secondary flow from the fan section to cool the nozzle section.

The greatest demand for cooling air to the nozzle occurs when the afterburner operates. As an example, the pilot operates the engine at maximum thrust (with the afterburner operating) in a conventional take-off and landing (CTOL) configuration. The CTOL configuration requires the greatest amount of cooling air to the nozzle.

Certain non-augmented operations of the engine (i.e. without the afterburner operating) also require cooling air. However, the amount of cooling air need is a reduced amount from augmented operations. As an example, a short take-off vertical landing (STOVL) configuration requires maximum non-augmented thrust from the engine. The non-augmented exhaust, while still at an elevated temperature, exhibits a lower temperature than during augmented operations. Accordingly, the engine can accept a reduced supply of cooling air to the nozzle when in the STOVL configuration.

Conventional valve assemblies have never compensated for the reduced need for cooling air in the STOVL configuration.

BRIEF SUMMARY OF THE INVENTION

It is an object of the present invention to provide a new and improved valve assembly.

It is a further object of the present invention to provide a valve assembly that provides cooling air to a nozzle of a gas turbine engine.

It is a further object of the present invention to provide a valve assembly that adjusts the rate of cooling air provided to the nozzle.

It is a further object of the present invention to provide a valve assembly that adjusts the cooling air flow rate depending on engine configuration.

It is a further object of the present invention to provide a passive valve assembly.

It is a further object of the present invention to provide a valve assembly that uses a passive actuator.

It is a further object of the present invention to provide an actuator that does not require a discrete motor.

It is a further object of the present invention to provide a lightweight valve assembly.

It is a further object of the present invention to provide a valve assembly that increases the available thrust of the engine during certain configurations.

These and other objects of the present invention are achieved in one aspect by a gas turbine engine. The engine comprises: a compressor section; a burner section; a turbine section; an afterburner section; a nozzle movable between a first configuration and a second configuration; and a valve assembly for supplying cooling air to said nozzle. The valve assembly reduces the cooling air to the nozzle as the nozzle approaches the second configuration.

These and other objects of the present invention are achieved in another aspect by a nozzle for discharging exhaust from a gas turbine engine. The nozzle comprises: a first section; a second section movable relative to the first section between a first configuration and a second configuration; a plurality of flaps defining an exit for the exhaust; and a valve assembly providing cooling air to the flaps. The valve assembly reduces the cooling air to the flaps as the nozzle approaches the second configuration.

These and other objects of the present invention are achieved in another aspect by a valve assembly for a nozzle of a gas turbine engine. The valve assembly includes: a first member having openings that receive cooling air; a second member placed adjacent the first member and having openings that receive the cooling air from the first member; and an actuator for moving the first member from a first position, which allows a first flow rate of cooling air to pass through the openings, to a second position, which allows a second flow rate of cooling air to pass through the openings. The second flow rate is less than the first flow rate.

BRIEF DESCRIPTION OF THE DRAWINGS

Other uses and advantages of the present invention will become apparent to those skilled in the art upon reference to the specification and the drawings, in which:

FIG. 2 is a cross-sectional perspective view of a portion of the engine in FIG. 1a;

FIG. 4b is the portion of the engine in FIG. 4a in the second configuration;

FIG. 5 is a perspective view of the portion of the engine in FIG. 4b; and

FIG. 6 is a detailed perspective view of a portion of the engine in FIG. 1a.

DETAILED DESCRIPTION OF THE INVENTION

Figure 1A:
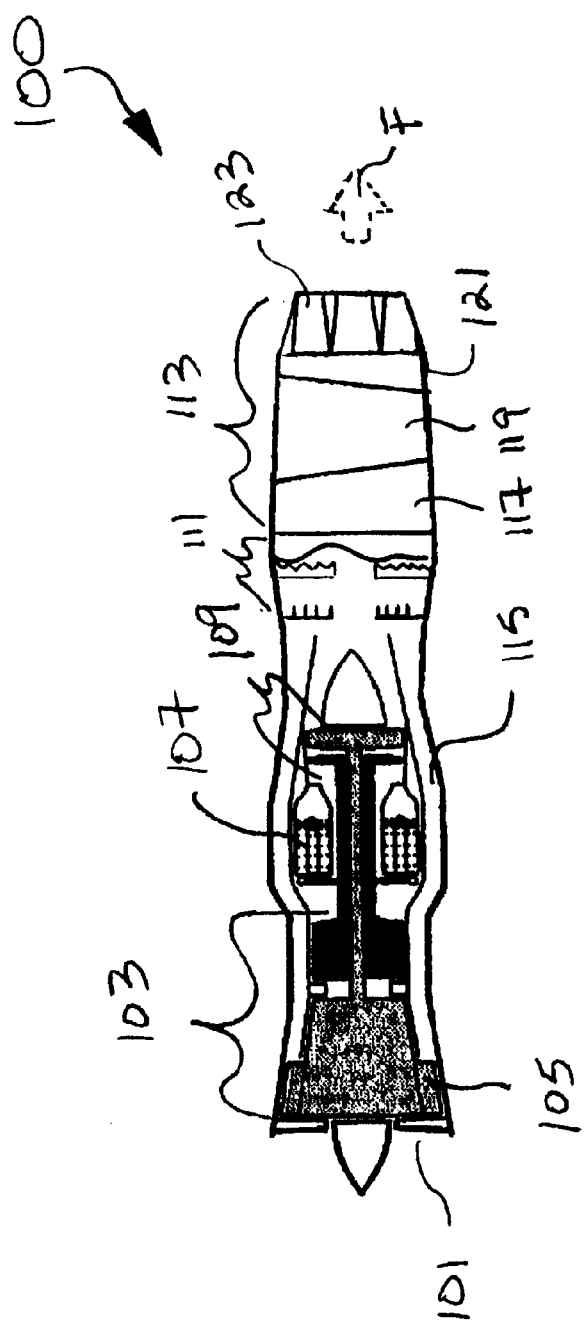
FIG. 1a is a partial cross-sectional view of an engine of the present invention in a first configuration.
Figure 1B:
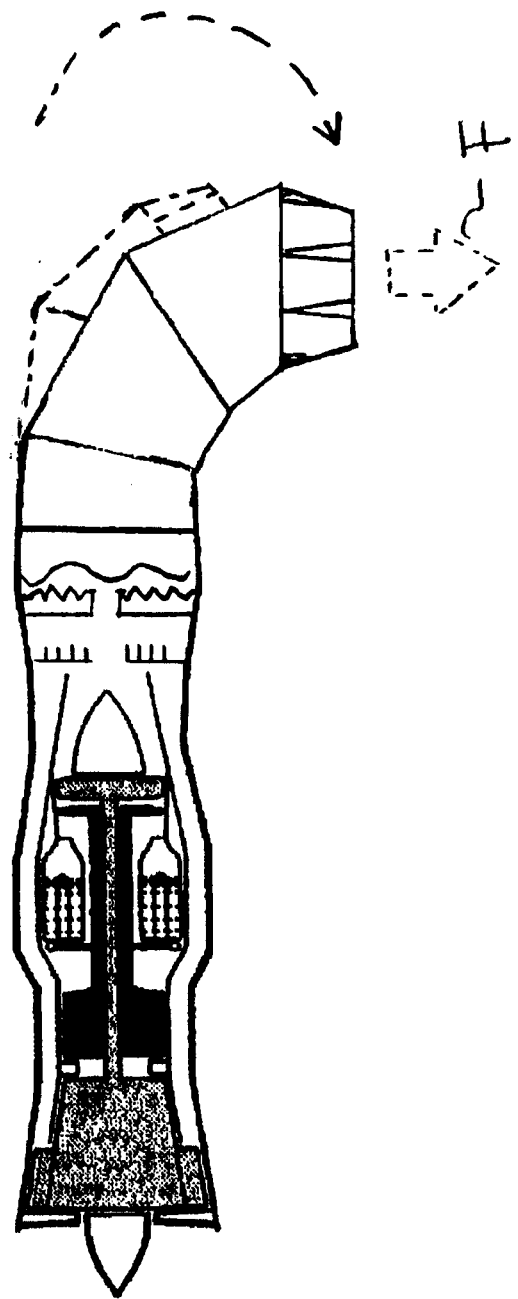
FIG. 1b is a partial cross-sectional view of the engine of FIG. 1a in a second configuration.

FIGS. 1a and 1b display an engine 100 of the present invention in two different configurations. FIG. 1a shows the engine 100 in a first configuration, such as a conventional take-off and landing (CTOL) configuration. FIG. 1b shows the engine 100 in a second configuration, such as a short take-off vertical landing (STOVL) configuration. FIG. 1b also shows, in phantom line, the engine 100 in transition between the CTOL and STOVL configurations.

The engine 100 has an inlet 101, a compressor section 103, a burner section 107, a turbine section 109, an afterburner section 111, and a nozzle section 113. The compressor section 103 includes a fan section 105 at the upstream end. The engine 100 also includes a bypass duct 115 for the secondary flow of air. The air flows through the engine 100 in the direction indicated by arrow F.

The nozzle section 113 includes a three bearing swivel duct secured to the afterburner section 111 and a nozzle downstream of the duct. The three bearing swivel duct has three sections 117, 119, 121. The first section 117 rotatably mounts to the afterburner section 111. The second section 119 rotatably mounts to the first section 117. Finally, the third section 121 rotatably mounts to the second section 119. Conventional motors (not shown) can rotate the sections 117, 119, 121 to any desired exhaust path between the first configuration shown in FIG. 1a and the second configuration shown in FIG. 1b.

The nozzle can be a conventional flap-type convergent-divergent nozzle 123 or any other suitable nozzle. The nozzle 123 secures to the third section 121 of the swivel duct.

The nozzle section 113 includes a liner 125. The liner 125 separates the outer structure of the nozzle section 113 from the hot exhaust gases travelling through the nozzle section. The liner 125 and the outer structure of the nozzle section 113 form an annular chamber 127. The engine 100 distributes cooling air through the annular chamber to cool the liner 125. After cooling the liner 125, the cooling air continues downstream to cool the nozzle flaps. A bleed (not shown) from the bypass duct 115 supplies the cooling air to the nozzle section 113 using conventional techniques.

The present invention is a valve assembly 200 that controls the amount of cooling air supplied to the nozzle flaps. All of the components of the valve assembly 200 described below are preferably made from a suitable aerospace grade material.

The valve assembly 200 has three modules 201, 203, 205. The first module 201 comprises a valve and associated support linkages. The second module 203 comprises an actuator. A third module 205 comprises an activation cam. Each module will be described in more detail below.

Figure 2:
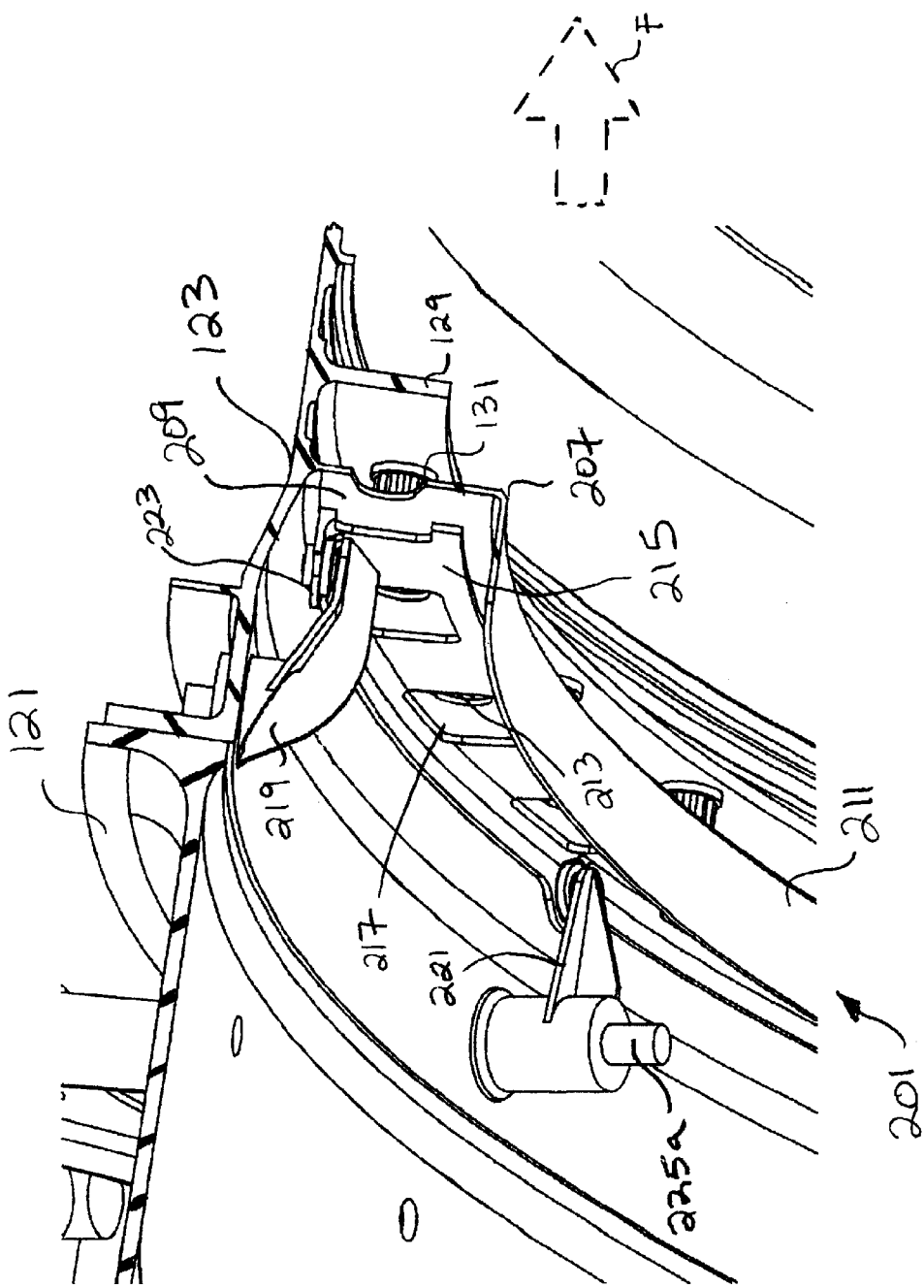

FIG. 2 is a cross-sectional, perspective view of a portion of the nozzle section 113. For clarity, the figure shows the nozzle section 113 without the liner 115. The nozzle 123 secures to the third section 121 of the swivel duct using conventional techniques such as with fasteners (not shown).

The nozzle 123 includes a flange 129. The flange 129 extends inwardly from the outer structure of the nozzle 123. A hinge assembly (not shown) for the nozzle flaps mounts to the flange 129 using suitable fasteners 131.

The nozzle 123 also includes a first ring 207 upstream of the flange 129. The ring 207 could have an L-shape in cross-section, with a panel 209 extending radially and a panel 211 extending longitudinally. Alternatively, the ring 207 could have any suitable shape. The ring 207 is preferably integral with the outer structure of the nozzle 123. Alternatively, the ring 207 could mount to the outer structure of the nozzle 123 using conventional techniques (not shown).

The panel 211 helps support the liner 125. The panel 209 has openings 213 therethrough. Although shown as having a teardrop shape, the openings 213 could have any suitable shape. The benefit of the teardrop shape is discussed below.

The nozzle 123 also includes a second ring 215 upstream of the first ring 207. The ring 215 is preferably flat and resides adjacent the first panel 209. However, the ring 215 could have any other suitable shape. The ring 215 has openings 217 therethrough. Although shown as rectangular, the openings 217 could have any suitable shape.

Differently than the ring 207, the ring 215 preferably movably mounts to the outer structure of the nozzle 123. The ring 215 mounts to the outer structure of the nozzle 123 using a plurality of cranks. Most of the cranks are idler cranks 219. One of the cranks is preferably a drive crank 221.

The idler cranks 219 pivotally mount to flanges 223 on the ring 215 and to the outer structure of the nozzle 113 using conventional techniques such as with bushings, washers and fasteners.

The drive crank 221 pivotally mounts to the flange 223 on the ring 215 in a fashion similar to the idler cranks 219. Differently than the idler cranks 219, the drive crank 221 rigidly secures to a drive shaft 225a using conventional techniques.

Figure 3A:
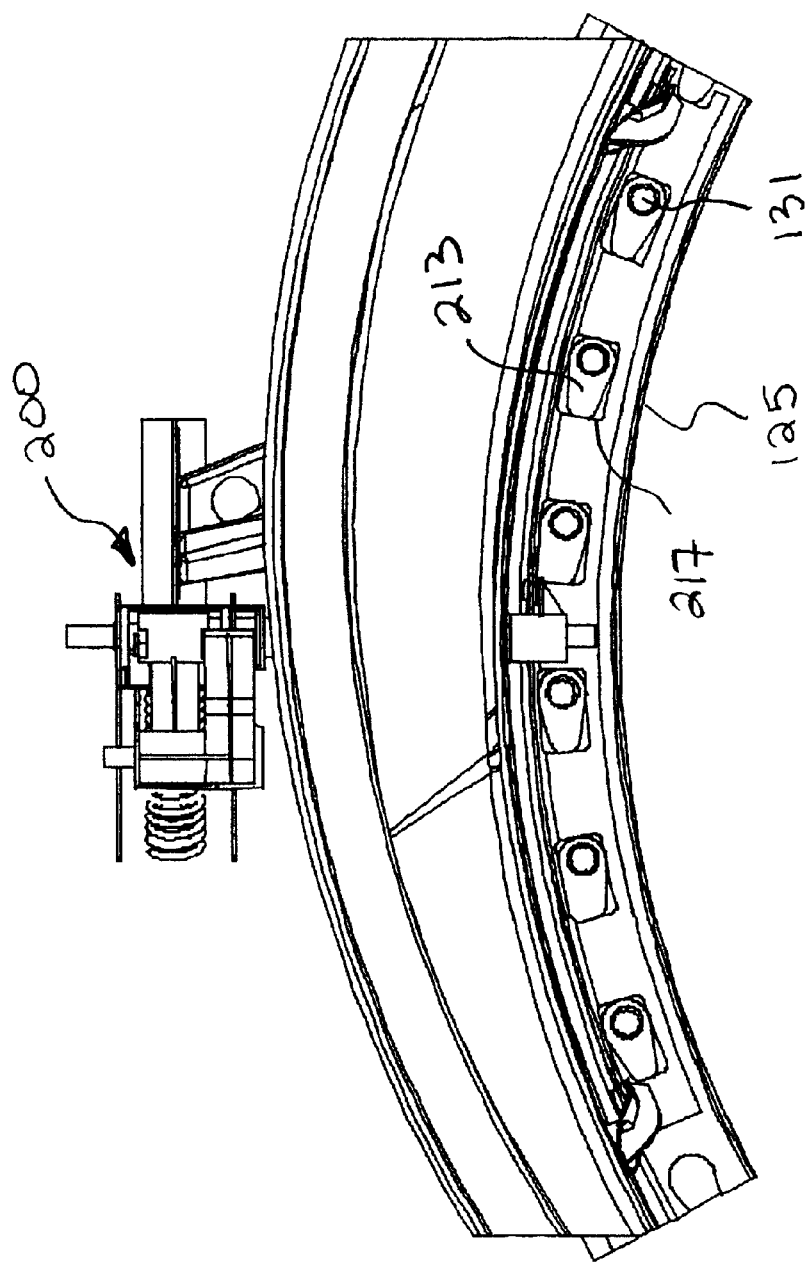
FIG. 3a is an elevational view, looking downstream, of a portion of the engine in FIG. 1a in a first configuration.

FIG. 3a shows the ring 215 and flange 209 in a first configuration. In this first configuration, the openings 217 in the ring 215 generally align with the openings 213 in the first flange 207. This allows a first flow rate of cooling air from the annular chamber 127 to reach the nozzle flaps. Also note in FIG. 3a that the openings 213 align with the fasteners 131 of the nozzle flap hinge assembly to provide access during assembly. Also in this first configuration, an axial gap exists between the ring 215 and the flange 209.

Rotation of the drive shaft 225a causes the drive crank 221 to move the ring 215 relative to the flange 207. Specifically, the ring 215 moves both transversely and axially relative to the flange 209. The idler cranks 219 ensure that the ring 215 retains a parallel orientation to the flange during movement. In the second configuration, the axial gap between the ring 215 and the flange 209 narrows. To avoid vibration of the ring 215 against the flange 209, the gap preferably remains (albeit smaller) when in the second configuration.

Figure 3B:
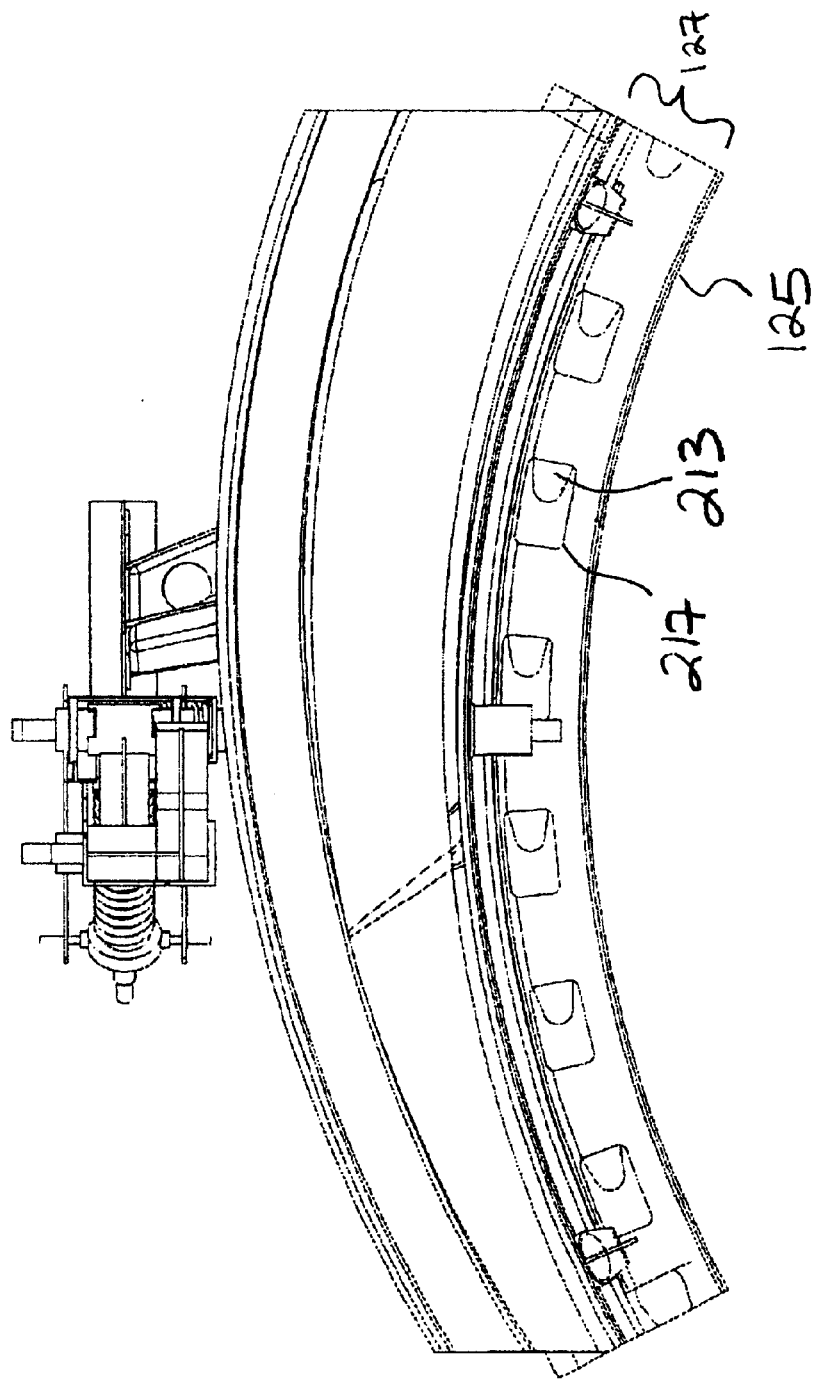
FIG. 3b is the portion of the engine in FIG. 3a in a second configuration.

Movement of the ring 215 from the first configuration to the second configuration alters the alignment of the openings 213, 217. FIG. 3b shows the ring 215 and flange 209 in a second configuration. The openings 217 in the ring 215 in this second configuration are misaligned with the openings 213 in the first flange 207. Since the openings 213, 217 still overlap, some cooling air can reach the nozzle flaps. The valve assembly 200 allows a second flow rate of cooling air (less than the first flow rate) to reach the nozzle flaps. Alternatively, the ring 215 could misalign the openings 213, 217 so that no overlap occurs. In this alternative, the second flow rate would be zero.

Since the travel distance of the ring 215 is relatively short, the teardrop shape of the opening 213 helps the valve assembly accommodate fluctuations in the positioning of the ring 215 relative to flange 207 without significantly altering flow rate. In other words, the teardrop shape of the opening 213 reduces the sensitivity of flow rate changes due to tolerances in the positioning of the ring 215 relative to the flange 207.

Figure 4A:
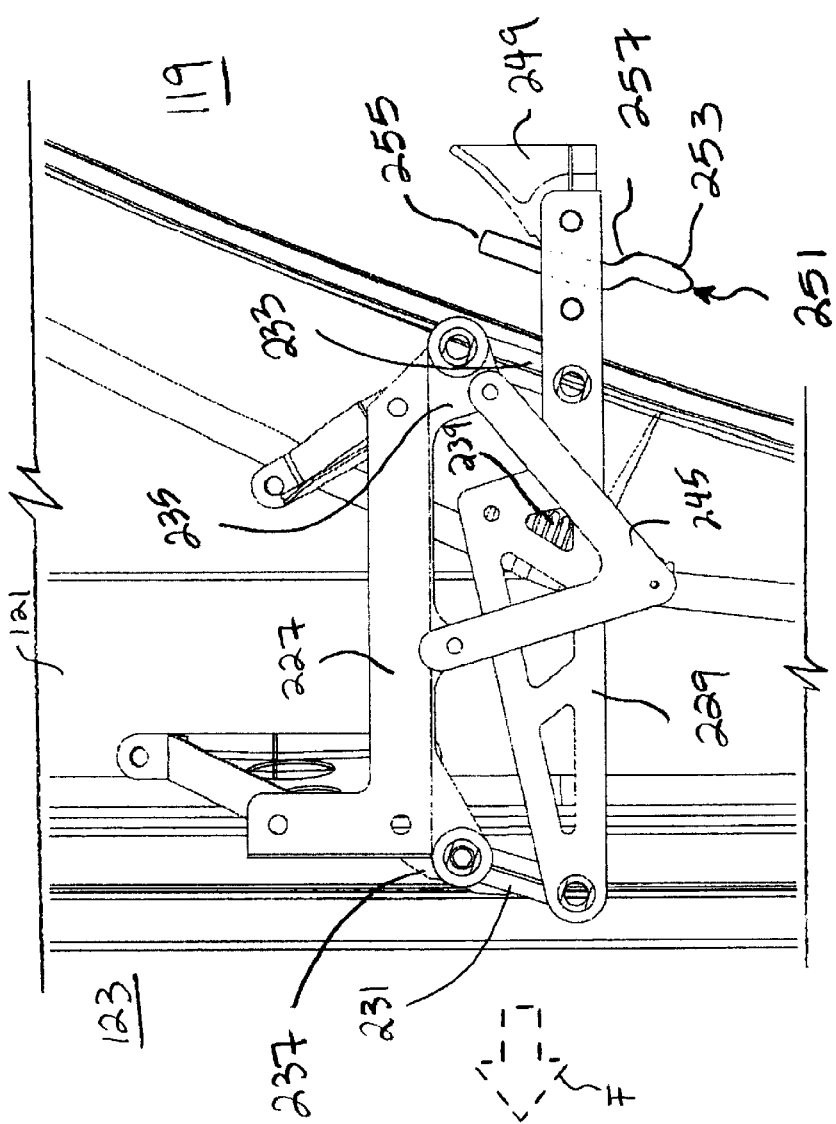
FIG. 4a is a plan view of the portion of the engine in FIG. 1a in the first configuration.
Figure 9H:
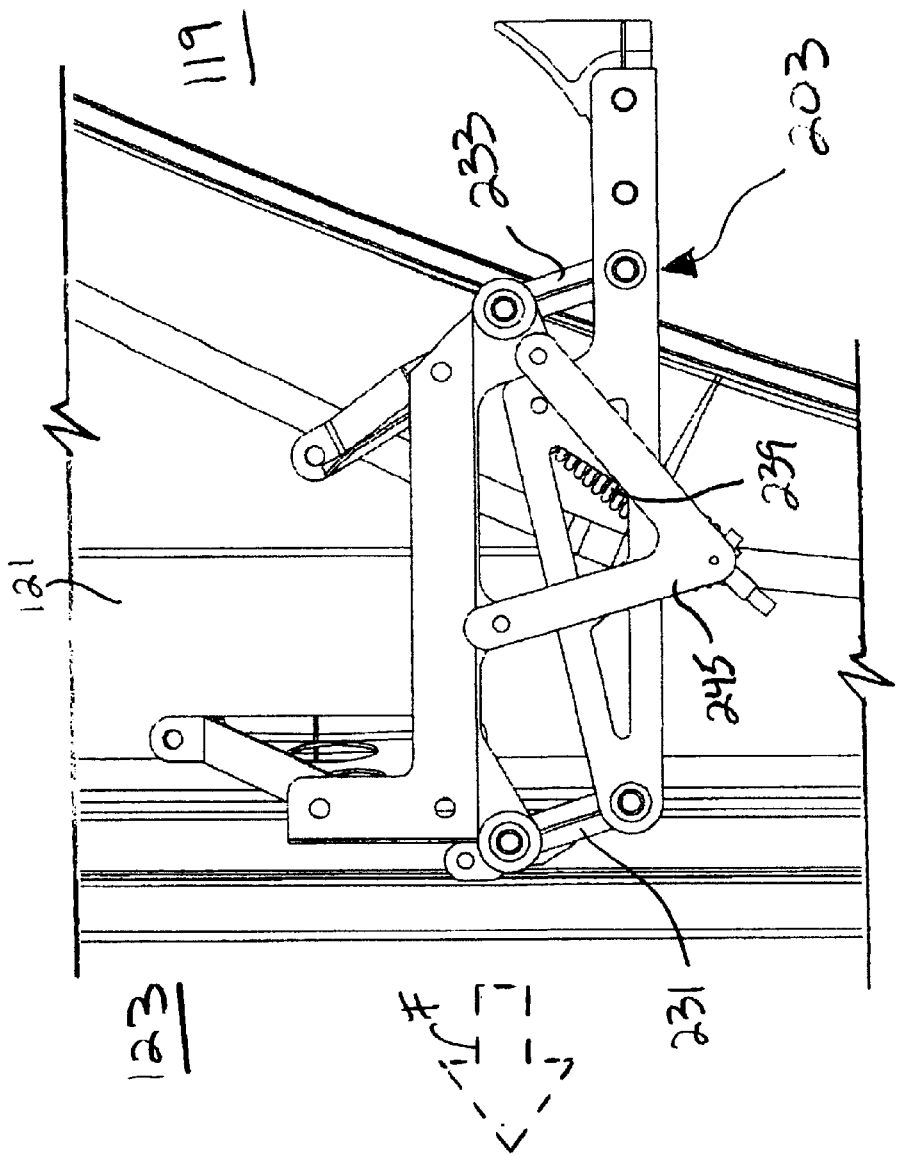

FIGS. 4a, 4b and 5 show the actuator module 203 of the valve assembly 200. Generally speaking, the actuator module 203 is a parallelogram linkage. A frame 227, a carrier 229 and two cranks 231, 233 form the parallelogram.

The frame 227 mounts to brackets on the third section 121 of the swivel duct using conventional techniques. The upstream end of the frame 227 includes a flange 235. The crank 231 pivotally mounts to the flange 235 using conventional techniques. The downstream end of the frame 227 includes an upper flange 237a and a lower flange 237b.

The shaft 225a, described earlier as being located in the annular chamber 127 of the nozzle section, extends outwardly from inside the nozzle section 113 and towards the lower flange 237b. The upper end of the shaft 225a has a plate 259a. The plate 259a corresponds to a plate 259b on an upper shaft 225b. Fasteners (not shown) secure the plates 259a, 259b together to create a continuous shaft 225a, 225b.

The shaft 225b extends through both flanges 237a, 237b. In order to actuate the ring 215 within the annular chamber 127, the crank 231 rigidly mounts to the shaft 225b between the flanges 237a, 237b.

A spring 261 surrounds the shaft 225b and abuts the lower flange 237b. During installation of the nozzle section 113 (which includes the lower shaft 225a), the spring 261 urges the upper shaft 225b and the crank 231 away from the lower flange 237b. In other words, the spring 261 automatically retracts the upper shaft 225b from the lower shaft 225b upon disconnection in order to aid the installation/removal of the nozzle section 113. After installation of the nozzle section 113, sufficiently elongated fasteners can extend through the holes in the plates 259a, 259b and tightened to draw the plates 259a, 259b together.

The cranks 231, 233 also pivotally mount to the carrier 229 using conventional techniques. In this parallelogram arrangement, the carrier 229 can move fore and aft relative to the frame 227. The fore and aft movement of the carrier rotates the cranks 231, 233. Rotation of the crank 231 causes the shaft 225 to rotate and to actuate the ring 215.

FIG. 4a shows the actuator module 203 in the first configuration. FIG. 4b shows the actuator module 203 in the second configuration. The actuator module 203 limits the fore movement of the carrier 229 by allowing the carrier 229 to abut a section of the frame 227. The actuator module 203 does not limit the aft movement of the carrier 229. Another feature of the valve assembly 200, described below, limits the aft movement of the carrier.

The valve assembly 200 preferably uses spring loading to urge the actuator module 203 to either the first configuration or the second configuration. The actuator module 203 includes a spring 239 surrounding a rod 241. Retainers 243 at each end of the rod 241 help compress the spring and mount the assembly. The retainer 243 at one end of the rod 241 rotatably mounts to the carrier 229 using conventional techniques. The other retainer 243 at the opposite end of the rod 241 rotatably mounts to a pair of angle brackets 245 secured to the frame 227 using conventional techniques.

The valve assembly 200 urges the actuator module 203 to either the first configuration or the second configuration by arranging the pivot points so as to produce an over center condition somewhere between the first and second configurations. Using the over center arrangement, the spring 239 can urge the carrier 229 to the first configuration (FIG. 4a) or to the second configuration (FIG. 4b). In the first configuration, the angle between the spring 239 and the carrier 229 is steep. The spring 239 will only transmit a small amount of force to the carrier.

As the actuator module 203 travels to the second configuration, the spring 239 will passes the over center position. The direction of the spring force reverses when passing the over center position. In the second configuration, the angle between the spring 239 and the carrier 229 is shallower than the first configuration. Thus, the spring 239 will transmit a greater amount of force to the carrier 229. This additional force ensures that the carrier 229 remains in the second configuration.

Figure 6:
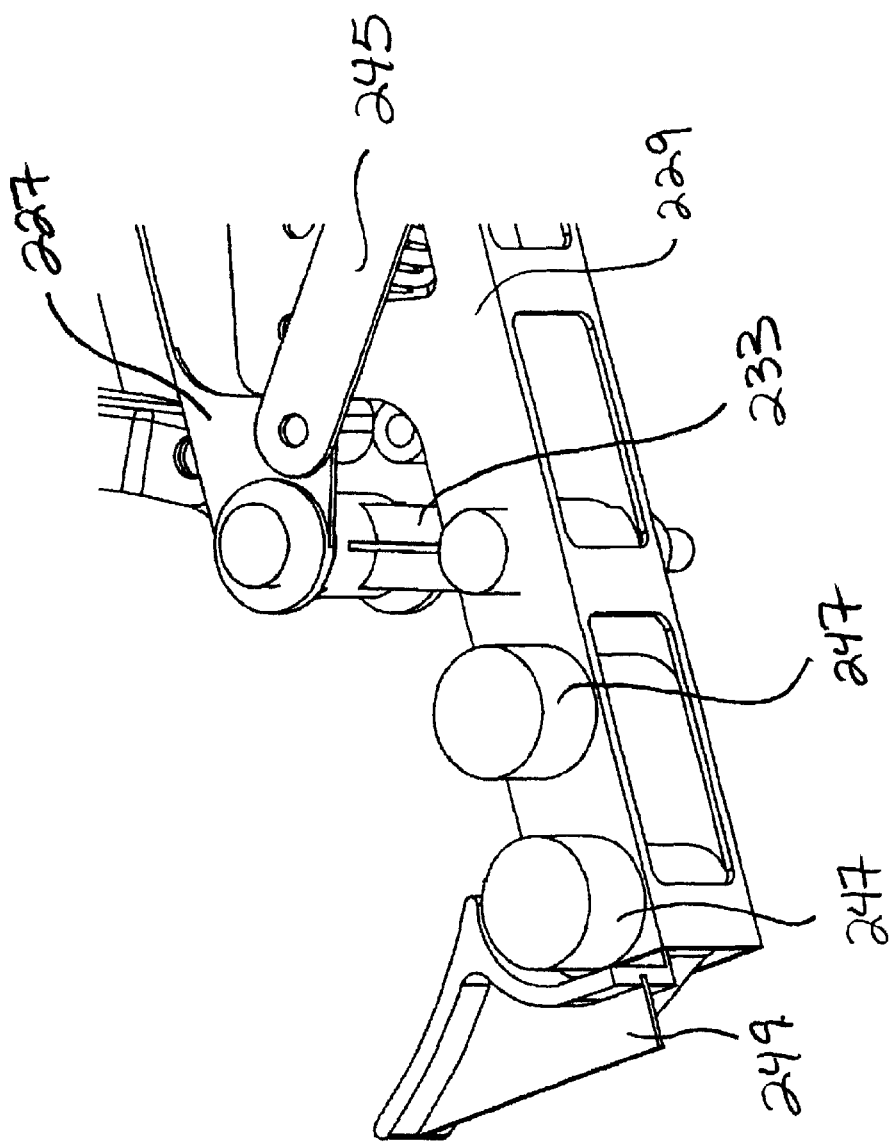

The upstream end of the carrier 229 extends over the second section 119 of the swivel duct. The upstream end of the carrier includes a cam follower assembly. FIG. 6 shows a bottom view of the cam follower assembly (the side shown faces the engine 100). The cam follower assembly comprises a pair of rollers 247 and a guide 249 mounted to the carrier 229 using conventional techniques. The purpose of the cam follower assembly will become clear below.

The exterior of the second section 119 of the swivel duct includes a cam 251. The cam 251 mounts to the second section 119 of the swivel duct using conventional techniques such as with brackets and fasteners. The cam 251 includes a first straight section 253 with a tapered tip, a second straight section 255 and a curved section 257 between the straight sections 253, 255. The cam follower assembly can receive the cam 251.

Since the cam 251 mounts to the second section 119 of the swivel duct (which can rotate relative to the third section 121 of the swivel duct), the cam follower assembly only receives the cam 251 when in the first configuration. As the engine 100 transitions to the second configuration, the cam 251 departs the cam follower assembly and travels to the opposite side of the engine 100 (since the second section 119 of the swivel duct rotate approximately 180° relative to the third section 121 of the swivel duct).

While located within the cam follower assembly, the cam 251 performs several tasks. First, the cam 251 prevents movement of the carrier 229 in the first configuration. In the first configuration, the second straight section 255 of the cam 251 resides between the rollers 247. In other words, the cam 251 defines the aft movement limit of the carrier 229.

Second, the cam 251 actuates the carrier 229. Specifically, the cam 251 moves the carrier 229 to the second configuration as the engine 100 transitions. During transition to the second configuration, the second section 119 of the swivel duct begins rotating relative to the third section 121 of the swivel duct. This movement places the curved section 257 of the cam 251 between the rollers 247. To accept the curved section 257, the rollers 247 cause the carrier to move forward into the second configuration. Further rotation of the second section 119 of the swivel duct places the first straight section 253 of the cam 251 between the rollers 247. Eventually, the cam 251 departs the cam follower assembly. This leaves the carrier 227 in the second configuration.

As the engine 100 returns to the first configuration, the tapered tip of the first straight section 253 of the cam 251 enters the cam follower assembly. The guide 249 helps place the first straight section 253 of the cam 251 between the rollers 247.

Further rotation of the second section 119 of the swivel duct towards the first configuration places the curved section 257 of the cam 251 between the rollers 247. To accept the curved section 257, the rollers 247 cause the carrier to move aft into the first configuration. Further rotation of the second section 119 of the swivel duct places the second straight section 255 of the cam 251 between the rollers 247. Eventually, the first straight section 253 of the cam 251 returns to the position between the rollers 247. The engine has just completed a cycle from the first configuration, to the second configuration, and back to the first configuration.

The cam 251 could have any suitable shape to ensure a smooth transition of the carrier 229 from the first configuration to the second configuration. In addition, the cam 251 could extend the entire distance (one half the circumference) that the second section 119 of the swivel duct travels from the first configuration to the second configuration. However, the shorter cam 251 described above is preferred for weight savings.

In the CTOL configuration, the engine 100 requires the most amount of cooling air to the nozzle flaps. Accordingly, the present invention orients the valve assembly 200 (e.g. FIG. 3a) to allow the greatest amount of cooling air to pass therethrough.

In the STOVL configuration, however, the engine 100 does not require as much cooling air to the nozzle flaps (since the afterburner does not operate). Accordingly, the present invention orients the valve assembly 200 (e.g. FIG. 3b) to reduce the amount of cooling air that passes therethrough.

The valve assembly 200 preferably only allows the necessary amount of cooling air to reach the nozzle flaps in the second configuration. In other words, the valve assembly 200 preferably does not oversupply cooling air to the nozzle flaps in the STOVL configuration. The "surplus" air that the valve assembly 200 does not divert to the nozzle flaps remains in the bypass duct 115. Remaining in the bypass duct 115, this surplus air can produce additional thrust in the engine 100. Any amount of additional thrust is beneficial to the aircraft when in the STOVL configuration.

Another benefit of the present invention is the ability of the valve assembly 200 to operate without a discrete motor. As discussed earlier, the rotation of the cam 251 mounted on the second section 119 of the swivel duct actuates the valve assembly. 200. The motor (not shown) that rotates the swivel duct is separate from the valve assembly 200. In other words, the present invention utilizes the motor from a different system of the engine 100 to actuate the valve assembly 200.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A gas turbine engine, comprising:
    a compressor section;
    a burner section;
    a turbine section;
    an afterburner section;
    a nozzle movable between a conventional take-off and landing (CTOL) configuration and a short take-off and vertical landing (STOVL) configuration; and
    a valve assembly for supplying cooling air to said nozzle;
    wherein said valve assembly reduces said cooling air to said nozzle as said nozzle approaches said (STOVL) configuration.

2. The engine as recited in claim 1, wherein said nozzle is a three bearing swivel duct.

3. The engine as recited in claim 2, wherein said (STOVL), configuration and said second configuration is a full short take-off vertical landing (STOVL) configuration.

4. The engine as recited in claim 3, wherein said afterburner does not operate in said STOVL configuration.

5. The engine as recited in claim 1, wherein said valve assembly receives said cooling air from said compressor section.

6. The engine as recited in claim 5, wherein said compressor section includes a fan section and said valve assembly receives said cooling air from said fan section.

7. The engine as recited in claim 1, further comprising an actuator to move said nozzle between said first configuration and said second configuration, wherein said actuator also drives said valve assembly.

8. A nozzle to discharge exhaust from a gas turbine engine, comprising:

a first section;

a second section movable relative to said conventional take-off and landing (CTOL) section between a first configuration and a short take-off and vertical landing (STOVL) configuration;

a plurality of flaps defining an exit for said exhaust; and a valve assembly providing cooling air to said flaps;

wherein said valve assembly reduces said cooling air to said flaps as said nozzle approaches said STOVL configuration.

9. The nozzle as recited in claim 8, wherein said nozzle is a three bearing swivel duct.

10. The nozzle as recited in claim 9, wherein said first section comprises an intermediate duct of said three bearing swivel duct and said second section comprises a rear duct of said three bearing swivel duct.

11. The nozzle as recited in claim 9, wherein said STOVL configuration is a full short take-off vertical landing (STOVL) configuration.

12. The nozzle as recited in claim 9, wherein said three bearing swivel duct includes an actuator for moving said three bearing swivel duct between said first configuration and said second configuration, and said actuator also drives said valve assembly.

13. A valve assembly for a nozzle of a gas turbine engine, comprising:

a first member having openings that receive cooling air;

a second member placed adjacent said first member and having openings that receive said cooling air from said first member; and an actuator for moving said first member from a first position, in which said openings are generally aligned to allow a first flow rate of said cooling air to pass through said openings, to a second position, in which said openings are generally misaligned to allow a second flow rate of said cooling air to pass through said openings;

wherein said second flow rate is less than said first flow rate.

14. The valve assembly as recited in claim 13, wherein said first and second members are annular.

15. The valve assembly as recited in claim 13, wherein said actuator rotates said first member.

16. The valve assembly as recited in claim 13, wherein said first position occurs when said engine is in a conventional take-off and landing (CTOL) configuration and said second position occurs when said engine is in a full short take-off vertical landing (STOVL) configuration.

17. The valve assembly as recited in claim 13, wherein said actuator is part of a three bearing swivel duct.

* * * * *